A. NELSON.
THRASHING MACHINE.
APPLICATION FILED JAN. 7, 1920.

1,408,770.

Patented Mar. 7, 1922.
3 SHEETS—SHEET 1.

INVENTOR
Aleck Nelson

BY Chas. E. Townsend
ATTORNEY

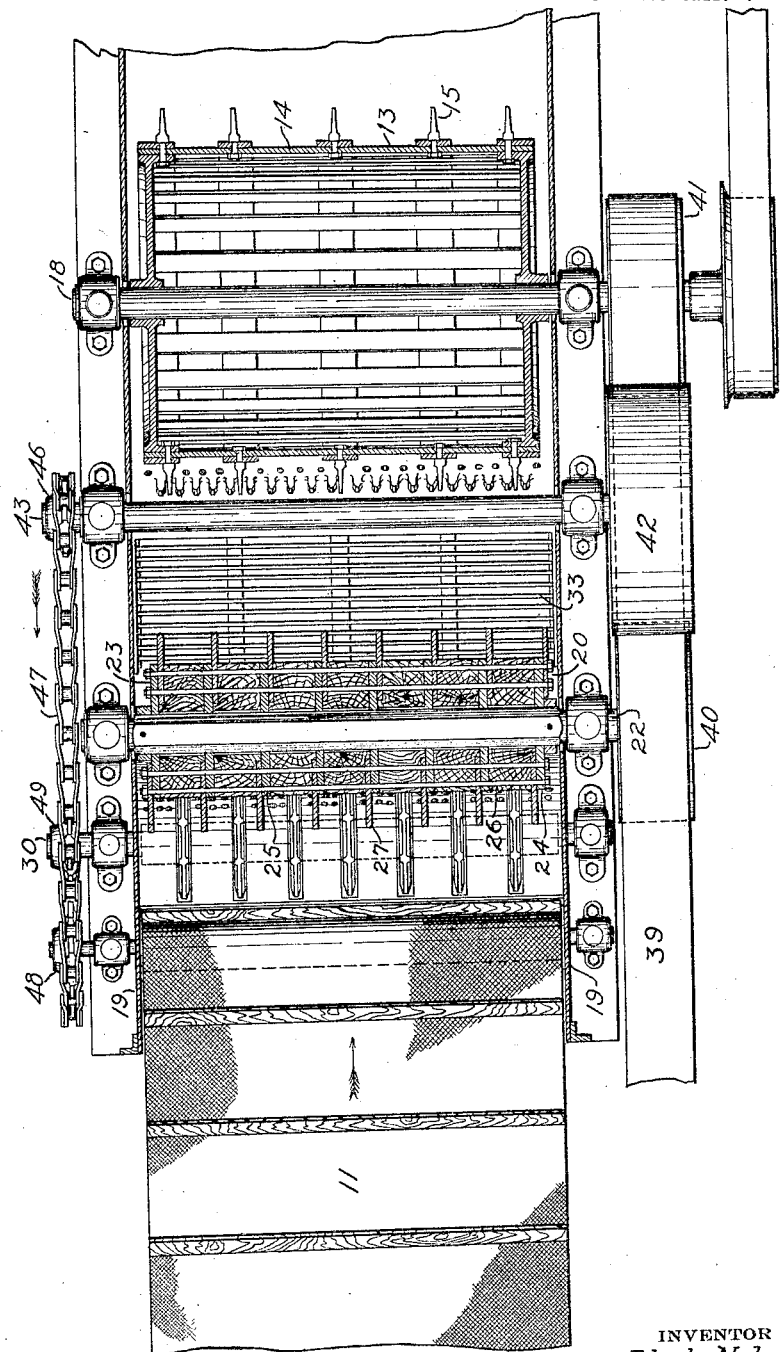

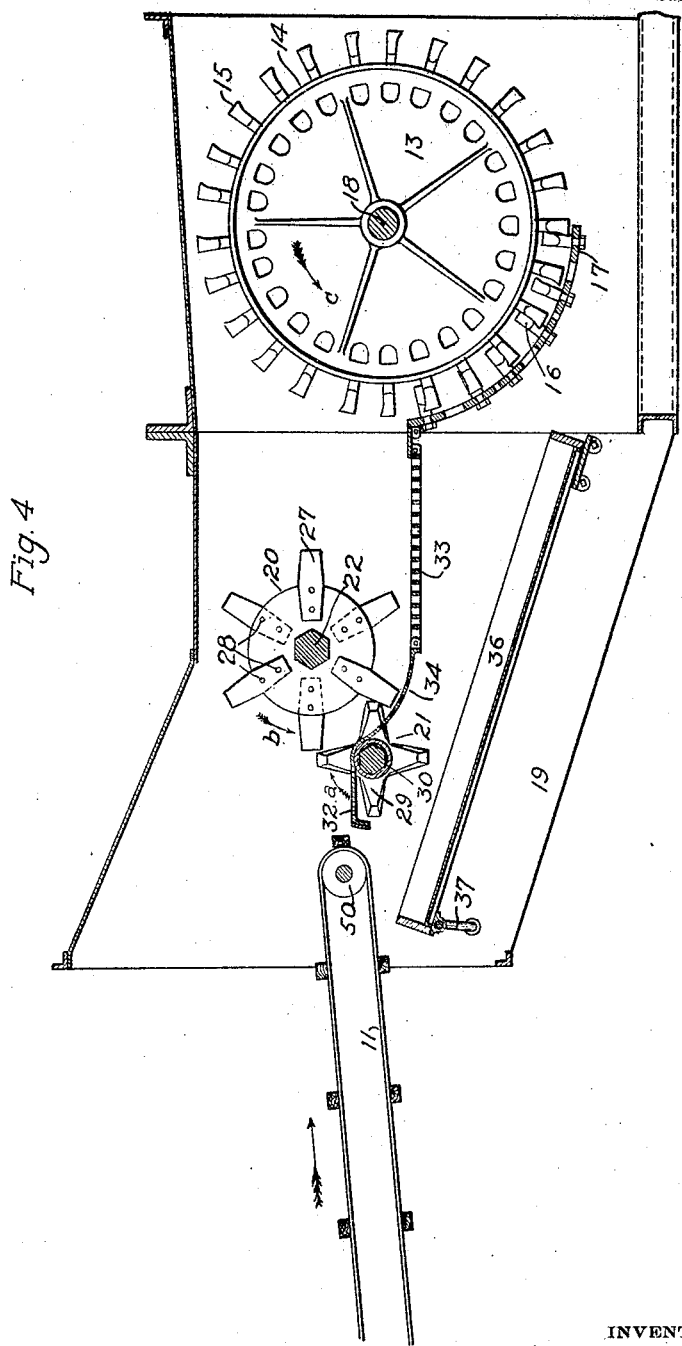

UNITED STATES PATENT OFFICE.

ALECK NELSON, OF WOODLAND, CALIFORNIA.

THRASHING MACHINE.

1,408,770. Specification of Letters Patent. Patented Mar. 7, 1922.

Application filed January 7, 1920. Serial No. 349,388.

*To all whom it may concern:*

Be it known that I, ALECK NELSON, a citizen of the United States, residing at Woodland, in the county of Yolo and State of California, have invented new and useful Improvements in Thrashing Machines, of which the following is a specification.

This invention relates to improvements in thrashing machines.

It is the principal object of the present invention to provide a structure adapted to be interposed between the bundled delivery means and the main thrashing drums of a thrashing machine to insure that the main drums will not be choked by the straw and grain delivered thereto, and to further make it possible for a considerable amount of the grain to be threshed from the straw prior to its delivery to the main thrashing cylinders, thereby making a larger per cent of recovery possible than has now been obtained.

It is the further object of the present invention to provide a structure as above mentioned which will act to cut the bundle strings and to cut up the straw in such a manner as to require less power in the operation of the thrashing machine than is now used in most instances.

The present invention contemplates the use of a rotary concave disposed at the end of the bundle feeding conveyor, said concave operating in conjunction with an auxiliary thrashing cylinder to cut the bundle strings and at the same time break up the straw and thresh a portion of the headed grain, after which the straw is passed over a grate and then delivered to the main fixed concave and the main thrashing cylinders.

The invention is illustrated by way of example in the accompanying drawings, in which:

Fig. 3 is a view in plan showing the relation of the present invention to the bundle carrier and the main thrashing drum.

Fig. 4 is a view in vertical section and elevation through the structure shown in Fig. 3.

Figure 1:
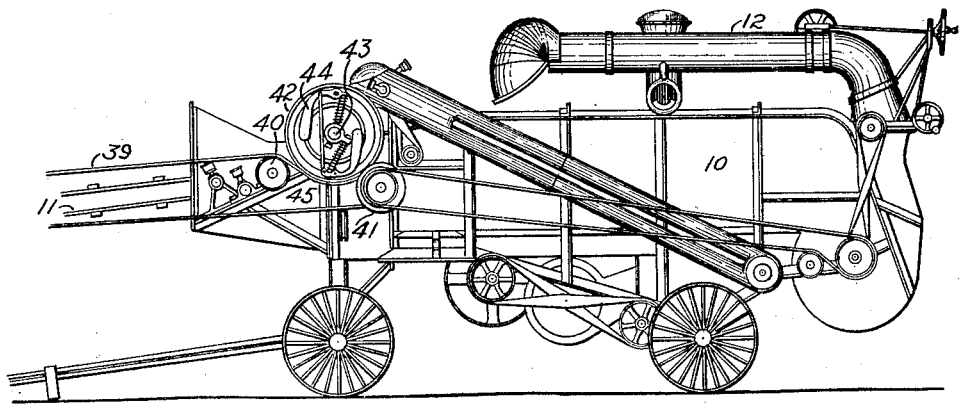
Figure 1 is a view in side elevation showing a complete thrashing machine embodying the present invention.

Referring more particularly to the drawings, 10 indicates a thrashing machine of any conventional design, and to which bundles of grain may be delivered by a bundle feed conveyor 11, and from which the straw may be carried by a stacker 12. Within the thrashing machine is mounted a main thrashing cylinder 13 more clearly shown in Fig. 4 as comprising a central drum 14, around the circumference of which is disposed a plurality of teeth 15. These teeth extend laterally from the circumference of the drum and are arranged in rows longitudinally of said drum. The teeth are adapted to pass between teeth 16 carried by a fixed concave plate 17. This plate is formed with perforations whereby the headed grain may fall through the plate and may thereafter be cleaned and recovered. The concave plate extends substantially from the horizontal axis of the drum shaft 18 to a point beneath the drum and terminating along approximately the vertical transverse axis of the shaft. It is usual practice to deliver bundles of grain to the thrashing cylinder 14 by means of the conveyor 11. In the present instance, however, an additional section of the thrasher housing is interposed between the mouth of the thresher and the conveyor as indicated at 19. Mounted within the housing extension 19 is an auxiliary thrashing drum 20 and a rotary member 21 which for the present description will be termed a rotary concave. The auxiliary thrashing cylinder 20 is similar in its construction and action to the main thrashing cylinder 13, while being of smaller diameter. This auxiliary cylinder is formed with a central shaft 22 upon the opposite ends of which belting flanges 23 and 24 are secured. A plurality of spacing flanges 25 are also mounted upon the shaft 22 and arranged in equal spaced relation to each other and between the bolting flanges 23 and 24. Wooden blocks 26 are used to fill the space between the flanges 25 and also to assist in anchoring teeth 27 which project radially from the drum and complete the thrashing cylinder although they are spaced farther apart than is common on ordinary thrashing cylinders. These teeth are held in seats formed in the blocks by means of fastening bolts 28 which will thus arrange the teeth in longitudinal rows on the drum and in radial disposition around the drum as shown in Fig. 4. The ends of the teeth project a considerable distance from the circumference of the drum and are adapted to pass between the teeth 29 of the rotary concave 21.

The rotary concave is mounted upon a shaft 30 extending through the ends of the housing 19 and disposed parallel to the shaft 22 while lying below the horizontal plane thereof. These teeth are formed with bevel faces and although not sharp, are of sufficient sharpness to break up the straw delivered from the bundles and at the same time to cut the bundle strings. As shown in Fig. 4, the teeth 29 of the concave 21 reach substantially the horizontal plane of the auxiliary thrashing drum 20 during their rotation and as they rotate in opposite directions, a throat will be formed into which the bundles of grain will be fed. The teeth 29 of the rotary concave are adapted to pass through slotted openings 31 in a guard plate 32. This guard plate extends downwardly around the lower quarter of the thrashing cylinder 20 and is formed with a plurality of perforations 34 through which the threshed grain may fall. A grate 33 is disposed between the lower end of the guard plate 34 and the upper edge of the fixed concave 17, thus providing a floor along which the broken straw and unthreshed grain will be passed to the main thrashing cylinder.

Mounted beneath the auxiliary thrashing cylinder 20 and the rotary concave 21 is a vibrating table 36. This table is disposed at an inclination and is adapted to be constantly vibrated by means of a shaker arm 37.

The thrashing mechanism is driven by a belt 39 which leads to a suitable driving pulley and is passed over a pulley 40 fixed upon the end of the auxiliary thrashing cylinder shaft 22. This belt is led around a pulley 41 fixed upon shaft 18 of the main thrashing cylinder and is thereafter led back to the driving pulley. Resting upon the length of the belt between the pulley 40 and the pulley 41 is a large driving pulley 42. This pulley is carried upon a shaft 43, journalled at the top of the thrashing machine housing. A governor control clutch mechanism 44 is incorporated within the pulley and operates against a drum 45 to retard rotation of the pulley under excessive speeds.

Figure 2:
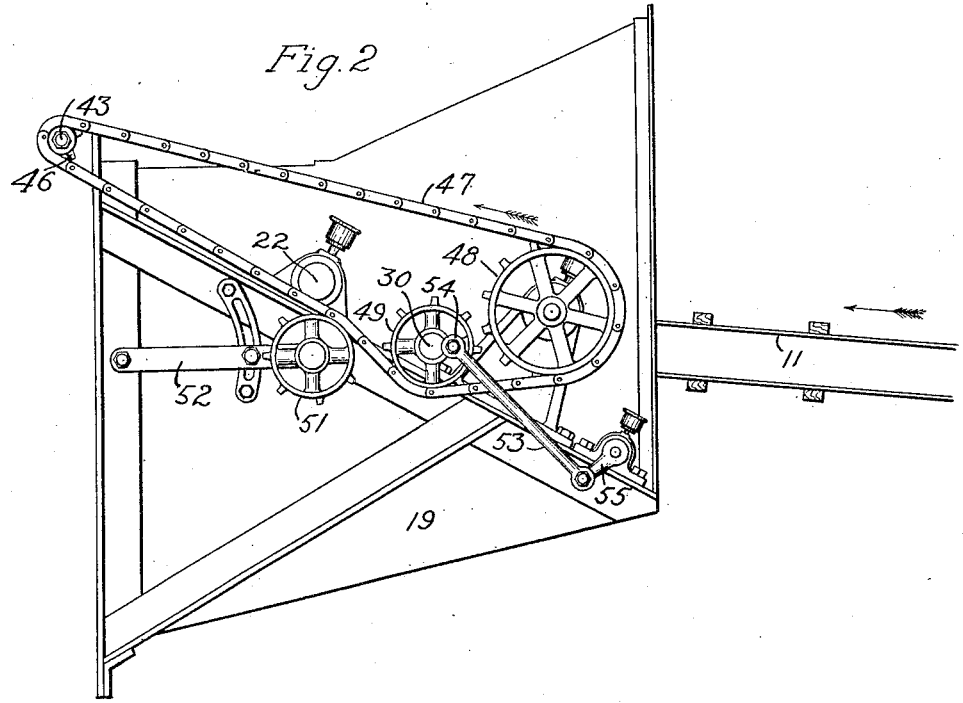
Fig. 2 is an enlarged view in side elevation showing part of the drive mechanism of the present invention.

The shaft 43 is fitted with a sprocket 46 around which a sprocket chain 47 is led. This chain is adapted to drive a sprocket 48 and a sprocket 49 as shown in Fig. 2. The sprocket 48 is mounted upon roller shaft 50 of the feed conveyor mechanism 11, while the sprocket 49 is mounted upon the shaft 30 of the rotary concave 21. Idler sprocket 51 is mounted upon an arm 52 and may be adjustably held against the lower run of the sprocket chain to maintain a desired tension.

The sprocket 49 not only drives the shaft 30 of the rotary concave but also operates a pitman rod 53 secured to it by a wrist pin 54. The opposite end of the pitman rod is pivoted to a shaker arm 55 adapted to oscillate the arm 37, secured to the vibrating table 36.

In the operation of the present invention bundles of grain are delivered to the mouth 56 of the thresher upon the conveyor 11. These bundles then pass into the thresher over the rotary concave 21 which is rotating in the direction of the arrow —a— as indicated in Fig. 4. The bundles will then be fed between this concave and the auxiliary thrashing cylinder 20 which is rotating in the direction of the arrow —b— in Fig. 4. The combined action of the teeth 27 upon the auxiliary thrashing cylinder and the teeth 29 of the rotary concave will act to break up the straw and head a certain per cent of the grain. This strong grain will then pass downwardly over the concave plate 34. The threshed grain will pass out through the perforations in the plate and fall on the shaking table 36, where it will be cleaned and delivered through suitable conveying means to a sack. The straw and unthreshed grain will pass over the grate 35 and will thereafter be fed down between the main thrashing cylinder 14 and the fixed concave 17. The main thrashing cylinder is rotating in the direction of the arrow —c— and will thus cause the straw to be cut up between the teeth 16 of the concave and the teeth 15 of the thrashing cylinder. The grain will also be threshed and will fall through perforations in the concave to be thereafter carried to sacking means.

In operation of the mechanism, the governor 44 will act to retard the movement of the rotary concave and the thrashing drum so that these drums will be maintained at a continuous rotating speed and without possibility of becoming choked by their rapid movement.

It will thus be seen that the thrashing machine improvements here disclosed will operate in conjunction with the ordinary thrashing machine mechanism to initially cut the bundle strings and break up the straw in a manner to insure the recovery of a greater percentage of the grain from the straw than is now possible. At the same time it will be noted that the initial thrashing operation will relieve the main thrashing cylinder of considerable strain and will permit it to be operated without requiring the power now used.

While I have shown the preferred form of my invention as now known to me, it will be understood that various changes in the combination, construction, and arrangement of parts may be made by those skilled in the art without departing from the spirit of the invention as claimed.

Having thus described my invention, what

I claim and desire to secure by Letters Patent, is:

1. A thrashing machine comprising an auxiliary thrashing cylinder and a co-acting cylinder with radial band cutting teeth passing between those of the first cylinder, means to supply bundled grain and pass it between said cylinders, a second thrashing cylinder and concave with intermediate screen, and means to discharge grain separated by the first cylinder through said screen before reaching the second thrashing cylinder and concave.

2. A thrashing and separating machine including a main toothed concave and a co-acting toothed cylinder, a feeding means, a toothed cylinder revoluble between the feeding means and the main cylinder and concave, a cylinder having combined band cutting and thrashing teeth, revoluble to engage and coact with the last named cylinder, and an inclined shaking table and a superimposed screen located below the auxiliary thrashing mechanisms.

3. A thrashing machine comprising a main cylinder and concave, an auxiliary cylinder and rotary concave, and an intermediate grated floor connecting the concaves, the auxiliary cylinder serving as a preliminary thresher, and consisting of a drum having interspaced sets of radially extending teeth thereon, radially extending teeth on the auxiliary concave co-acting with the drum teeth and serving as a band cutter.

4. In a thrashing machine, a bundle fed conveyor, a rotary concave disposed at the end of said conveyor and formed with a plurality of radially extending fingers arranged in rows around the concave and spaced in relation to each other longitudinally thereof, a shield plate through which the teeth of said concave may pass during the rotation of the concave, an auxiliary thrashing cylinder operating in connection with said rotary concave and acting therewith to break up the straw and thresh the grain delivered from the conveyor, a grated floor extending beneath the auxiliary thrashing cylinder and through which the threshed grain may fall, a fixed concave with its upper edge disposed at the end of said grated floor, and a main thrashing drum operating in conjunction with said fixed concave and adapted to complete the thrashing of the grain delivered from the auxiliary cylinder.

5. A thrashing machine including a bundle conveyor, a rotary concave at the end of said conveyor formed with a plurality of extended radially disposed fingers, a shield plate through which said fingers may pass during the rotation of the concave, an auxiliary thrashing cylinder acting in conjunction with the rotary concave to separate, break up and thrash the straw, a grated floor through which the thrashed grain may fall and over which the straw may pass, and a main thrashing cylinder, the concave of which is connected to receive the straw from the grated floor and complete the thrashing.

6. A thrashing machine including two thrashing cylinders and their concaves disposed in succession and a grated floor connecting the concaves, a rotary concave having radially extending teeth and a shield plate through which said teeth pass anterior to the first thrashing cylinder, and acting therewith to break up and thrash passing straw, and a conveyor by which the grain in bundles may be delivered to the rotary concave.

ALECK NELSON.

Witnesses:
JOHN H. HERRING,
W. W. HEALEY.